(12) United States Patent
Hayasaka

(10) Patent No.: US 11,461,797 B2
(45) Date of Patent: Oct. 4, 2022

(54) PRIVILEGE GRANTING DEVICE, PRIVILEGE GRANTING METHOD, AND PROGRAM

(71) Applicant: Rakuten Group, Inc., Tokyo (JP)

(72) Inventor: Daigo Hayasaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/363,392

(22) Filed: Jun. 30, 2021

(65) Prior Publication Data

US 2022/0101360 A1 Mar. 31, 2022

(30) Foreign Application Priority Data

Sep. 29, 2020 (JP) .............................. JP2020-162956

(51) Int. Cl.
*G06Q 30/02* (2012.01)
(52) U.S. Cl.
CPC ..... *G06Q 30/0217* (2013.01); *G06Q 30/0201* (2013.01); *G06Q 30/0224* (2013.01); *G06Q 30/0235* (2013.01)
(58) Field of Classification Search
CPC ........... G06Q 30/0217; G06Q 30/0201; G06Q 30/0224; G06Q 30/0235
See application file for complete search history.

(56) References Cited

U.S. PATENT DOCUMENTS

| | | | | |
|---|---|---|---|---|
| 7,664,726 B2* | 2/2010 | Jain | ........................ | G06Q 30/02 707/999.001 |
| 10,963,903 B1* | 3/2021 | Stewart | .............. | G06Q 30/0234 |
| 2012/0208634 A1* | 8/2012 | Cohen | .................... | G16H 40/67 709/204 |
| 2013/0211893 A1* | 8/2013 | Bryant | ............... | G06Q 30/0267 705/14.16 |
| 2015/0081465 A1* | 3/2015 | Dyment | ................. | G06Q 50/01 705/26.1 |
| 2017/0132688 A1* | 5/2017 | Freund | .................... | G06Q 50/01 |
| 2020/0234312 A1* | 7/2020 | George | ............. | G06Q 30/0201 |

FOREIGN PATENT DOCUMENTS

JP 2018-085014 A 5/2018

OTHER PUBLICATIONS

"Instagram announces new policies for promoting diet products, cosmetic procedures" (Thorbecke, Catherine; Published on Sep. 19, 2019 at https://abcnews.go.com/Business/instagram-announces-policies-promoting-diet-products-cosmetic-procedures/story?id=65716682); (Year: 2019).*

* cited by examiner

*Primary Examiner* — James M Detweiler
(74) *Attorney, Agent, or Firm* — Sughrue Mion, PLLC

(57) ABSTRACT

Provided are a privilege granting device, a privilege granting method, and a program capable of providing motivation to continuously purchase a product by posting and checking, between shoppers having purchased the same product, that an activity associated with the product has been done. A post acceptor accepts, from a shopper having purchased a product, a post that the shopper has done an activity associated with the product. A publisher publishes the accepted post. A report acceptor accepts a report that another shopper having purchased the product has read the published post and checked a content of the read post. A determiner determines, when the shopper repurchases the product, a privilege to be granted to the shopper according to whether the report is accepted.

15 Claims, 7 Drawing Sheets

PRIVILEGE GRANTING DEVICE, PRIVILEGE GRANTING METHOD, AND PROGRAM

TECHNICAL FIELD

The present disclosure relates to a privilege granting device, a privilege granting method, and a program.

BACKGROUND ART

A shopping site through which various products can be bought and sold via the Internet is known. Various contrivances are made in a shopping site in order to encourage a shopper to continuously purchase a product.

For example, Patent Literature 1 discloses a technique for changing a privilege to be granted to a shopper on the basis of a purchase history of the shopper in order to motivate the shopper to continuously purchase a product.

CITATION LIST

Patent Literature

Patent Literature 1: Unexamined Japanese Patent Application Publication No. 2018-85014

SUMMARY OF INVENTION

Technical Problem

Meanwhile, there is also a desire to further enhance motivation of a shopper to continuously purchase a product by using an action between shoppers as well as granting a privilege to the shopper.

The present disclosure solves a problem as described above, and an objective of the present disclosure is to provide a privilege granting device, a privilege granting method, and a program capable of providing motivation to continuously purchase a product by posting and checking, between shoppers having purchased the same product, that an activity associated with the product has been done.

Solution to Problem

A privilege granting device according to a first point of view of the present disclosure is characterized by including:

a post acceptor accepting, from a shopper having purchased a product, a post that the shopper has done an activity associated with the product;

a publisher publishing the accepted post;

a report acceptor accepting a report that another shopper having purchased the product has read the published post and checked a content of the read post; and a determiner determining, when the shopper repurchases the product, a privilege to be granted to the shopper according to whether the report is accepted.

Further, the privilege granting device according to the above point of view is characterized in that the publisher preliminarily publishes, on a shopping site, the product and the activity associated with the product.

Further, the privilege granting device according to the above point of view is characterized in that, when the activity is selected by the shopper, the publisher suggests a product associated with the selected activity to the shopper.

Further, the privilege granting device according to the above point of view is characterized in that the report acceptor determines whether to accept the report according to whether a timing of the purchase of the product and the post by the shopper and a timing of the purchase of the product and the check by the another shopper satisfy a predetermined condition.

Further, the privilege granting device according to the above point of view is characterized in that the report acceptor relaxes the predetermined condition according to a number of other shoppers determined as having made the report to be accepted.

Further, the privilege granting device according to the above point of view is characterized in that, when the number of other shoppers determined as having made the report to be accepted is less than a predetermined value, the report acceptor relaxes the predetermined condition in such a way that the number of other shoppers determined as having made the report to be accepted increases.

Further, the privilege granting device according to the above point of view is characterized in that the predetermined condition is a condition that a period from the purchase to the post by the shopper is within a first range.

Further, the privilege granting device according to the above point of view is characterized in that the predetermined condition is a condition that a period from the purchase of the product to the check of the post by the another shopper is within a second range.

Further, the privilege granting device according to the above point of view is characterized in that the predetermined condition is a condition that a period from the purchase of the product by the shopper to the purchase of the product by the another shopper is within a third range.

Further, the privilege granting device according to the above point of view is characterized in that the predetermined condition is a condition that a period from the post by the shopper to the check of the post by the another shopper is within a fourth range.

Further, the privilege granting device according to the above point of view is characterized in that the determiner determines the privilege to be granted to the shopper when a period from the post by the shopper to the repurchase of the product by the shopper is within a fifth range.

Further, the privilege granting device according to the above point of view is characterized in that the determiner determines the privilege to be granted to the shopper according to whether the timing of the purchase of the product and the post by the shopper and the timing of the purchase of the product and the check by the another shopper satisfy the predetermined condition, and whether a period from the post by the shopper to the repurchase of the product by the shopper is within a fifth range.

Further, the privilege granting device according to the above point of view is characterized in that the activity associated with the product is use of the product.

Further, the privilege granting device according to the above point of view is characterized in that the activity associated with the product is achievement of a preliminarily determined goal by use of the product.

A privilege granting method according to a second point of view of the present disclosure is a privilege granting method executed by a privilege granting device, and is characterized by including:

accepting, by the privilege granting device, from a shopper having purchased a product, a post that the shopper has done an activity associated with the product;

publishing, by the privilege granting device, the accepted post;

accepting, by the privilege granting device, a report that another shopper having purchased the product has read the published post and checked a content of the read post; and determining, by the privilege granting device, when the shopper repurchases the product, a privilege to be granted to the shopper according to whether the report is accepted.

A program according to a third point of view of the present disclosure is characterized by causing a computer to function as:

a post acceptor accepting, from a shopper having purchased a product, a post that the shopper has done an activity associated with the product;

a publisher publishing the accepted post;

a report acceptor accepting a report that another shopper having purchased the product has read the published post and checked a content of the read post; and a determiner determining, when the shopper repurchases the product, a privilege to be granted to the shopper according to whether the report is accepted.

The above program may be recorded on a non-transitory recording medium. The non-transitory recording medium can be distributed and sold independently of a computer. Herein, the non-transitory recording medium is a tangible recording medium. The non-transitory recording medium is, for example, a compact disc, a flexible disk, a hard disk, a magneto-optical disk, a digital video disc, a magnetic tape, a semiconductor memory, and the like. Further, a transitory recording medium indicates a transmission medium (propagation signal) per se. The transitory recording medium is, for example, an electrical signal, an optical signal, an electromagnetic wave, and the like. Note that, a temporary storage area is an area for temporarily storing data or a program, and is a volatile memory such as, for example, a random access memory (RAM).

Advantageous Effects of Invention

The present disclosure can provide a privilege granting device, a privilege granting method, and a program capable of providing motivation to continuously purchase a product by posting and checking, between shoppers having purchased the same product, that an activity associated with the product has been done.

DESCRIPTION OF EMBODIMENTS

1. Overall Configuration

Figure 1:
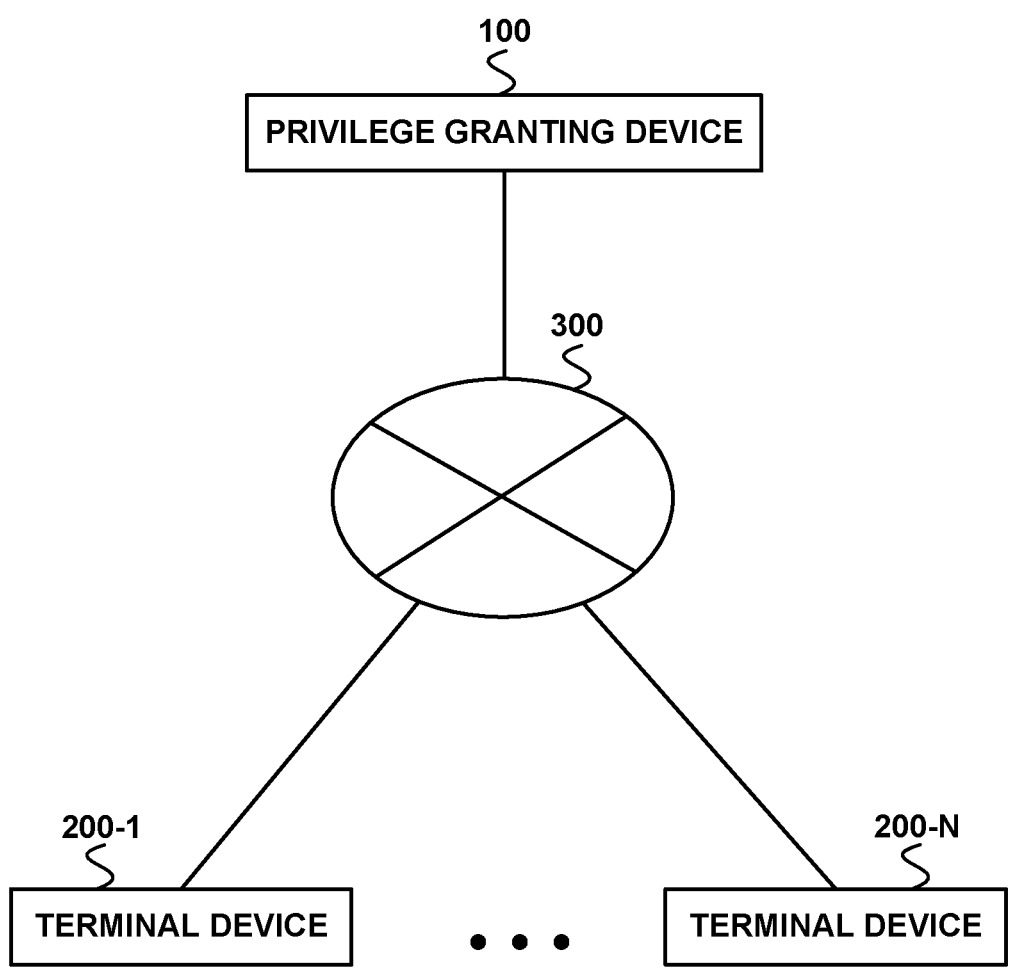
FIG. 1 is a diagram illustrating a relation between a privilege granting device and a terminal device according to an embodiment.

As illustrated in FIG. 1, a privilege granting device 100 according to an embodiment of the present disclosure is communicably connected with a plurality of terminal devices 200-1, . . . , and 200-N (where N is a natural number equal to or more than 2) via a network 300. Hereinafter, the terminal devices 200-1, . . . , and 200-N will be collectively written as a terminal device 200 unless a specific terminal device is described.

The privilege granting device 100 is a device that receives, from the terminal device 200, a post relating to a product and a check of the post. For example, the privilege granting device 100 is a shopping server that manages a shopping site.

The terminal device 200 is a device used by a shopper. The terminal device 200 is, for example, a smartphone, a tablet computer, and the like.

The network 300 is a wireless or wired communication network. The network 300 may be any network, and is, for example, the Internet, an intranet, an extranet, a local area network (LAN), a virtual private network (VPN), a telephone line network, and the like.

2. Hardware Configuration of Privilege Granting Device

Figure 2:
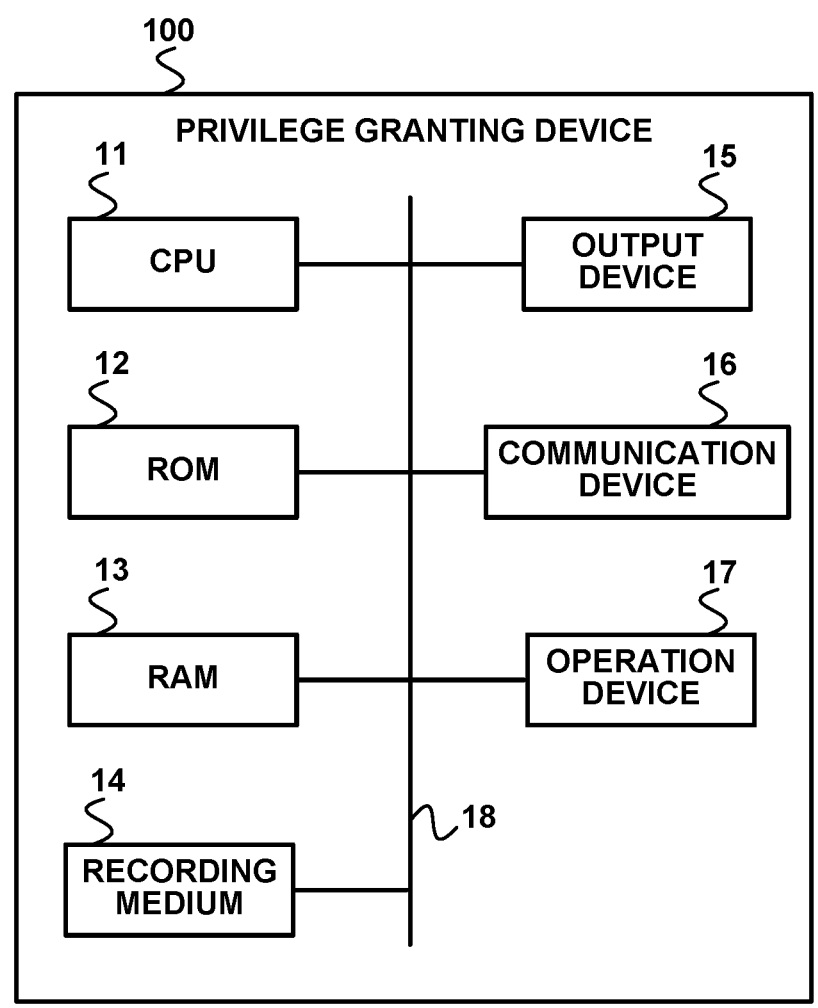
FIG. 2 is a diagram illustrating a hardware configuration of the privilege granting device according to the embodiment.

FIG. 2 is a block diagram illustrating a hardware configuration of the privilege granting device 100.

As illustrated in FIG. 2, the privilege granting device 100 includes a central processing unit (CPU) 11, a read-only memory (ROM) 12, a RAM 13, a recording medium 14, an output device 15, a communication device 16, and an operation device 17. Each of the components is interconnected by a bus 18.

The CPU 11 controls an operation of the entire privilege granting device 100, and is connected with each of the components to exchange a control signal or data with each other.

The ROM 12 records a program or various kinds of data for operation necessary for operation control of the entire privilege granting device 100.

The RAM 13 is for temporarily recording data or a program, stores a program or data read from the recording medium 14, and besides stores data and the like necessary for communication.

The recording medium 14 includes a hard disk, a flash memory, and the like, and records data being processed by the privilege granting device 100.

The output device 15 includes a display device such as a liquid crystal display (LCD) and a backlight, and a voice output device such as a loudspeaker. The output device 15 outputs, for example, data output from the CPU 11 under control of the CPU 11.

The communication device 16 includes a communication interface for connecting the privilege granting device 100 to a computer communication network such as the Internet, and interaction with another information processing device and the like is performed via the communication device 16.

The operation device 17 includes an input device such as a button, a keyboard, a touch panel, and a microphone. The operation device 17 accepts an operation input from a user of the privilege granting device 100, and outputs a signal corresponding to the accepted operation input to the CPU 11.

The privilege granting device 100 according to the present embodiment is achieved by powering on the privilege granting device 100 and executing a program causing to function as the privilege granting device 100 according to the present embodiment.

3. Function Configuration of Privilege Granting Device according to Embodiment

Figure 3:
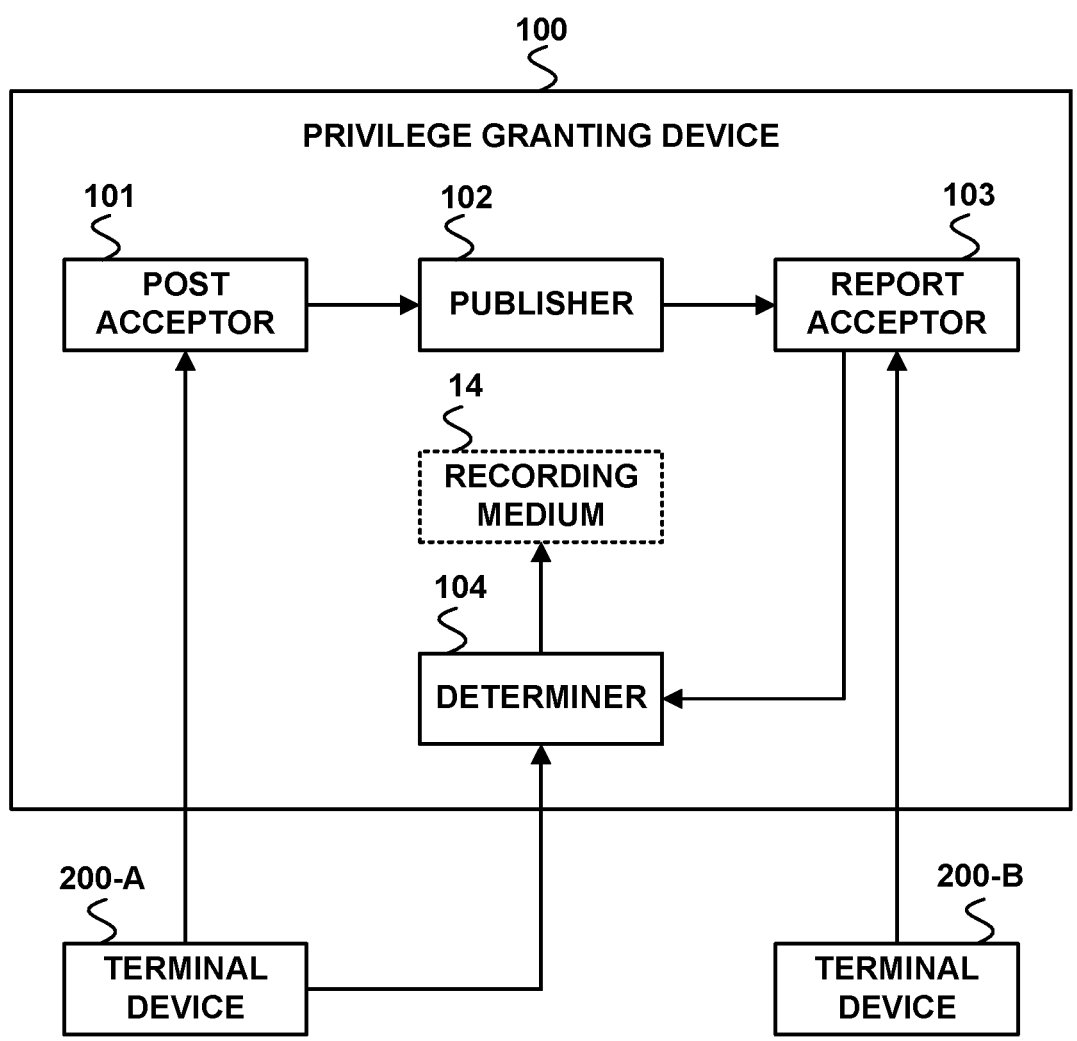
FIG. 3 is a diagram illustrating a function configuration of the privilege granting device according to the embodiment.

As illustrated in FIG. 3, the privilege granting device 100 functionally includes a post acceptor 101, a publisher 102, a report acceptor 103, and a determiner 104. In the present embodiment, the CPU 11 and the communication device 16 cooperatively function as the post acceptor 101, the publisher 102, and the report acceptor 103, and the CPU 11 functions as the determiner 104.

The post acceptor 101 accepts, from a shopper having purchased a product, a post that the shopper has done an activity associated with the product.

The product may be any product, as long as continuous purchase is expected. The product is, for example, a supplement, a drink, a food, an educational material, and the like. The activity associated with the product is achievement of a preliminarily determined goal by use of the product. For example, when the product is a supplement X having an expected effect for weight loss, the preliminarily determined goal is weight loss and the achievement of the goal is achievement of weight loss. As will be described later, the product and the activity associated with the product are preliminarily published on a shopping site. Note that, a shopper may be allowed to set a detail of the goal as appropriate. For example, when the preliminarily determined goal is weight loss, a shopper may be allowed to set how many kgs of weight to lose.

For example, when a shopper A having purchased the supplement X posts, using a terminal device 200-A, an image of measuring weight on a scale and a text indicating achievement of 2 kg weight loss, the post acceptor 101 accepts the post from the shopper A.

Figure 4:
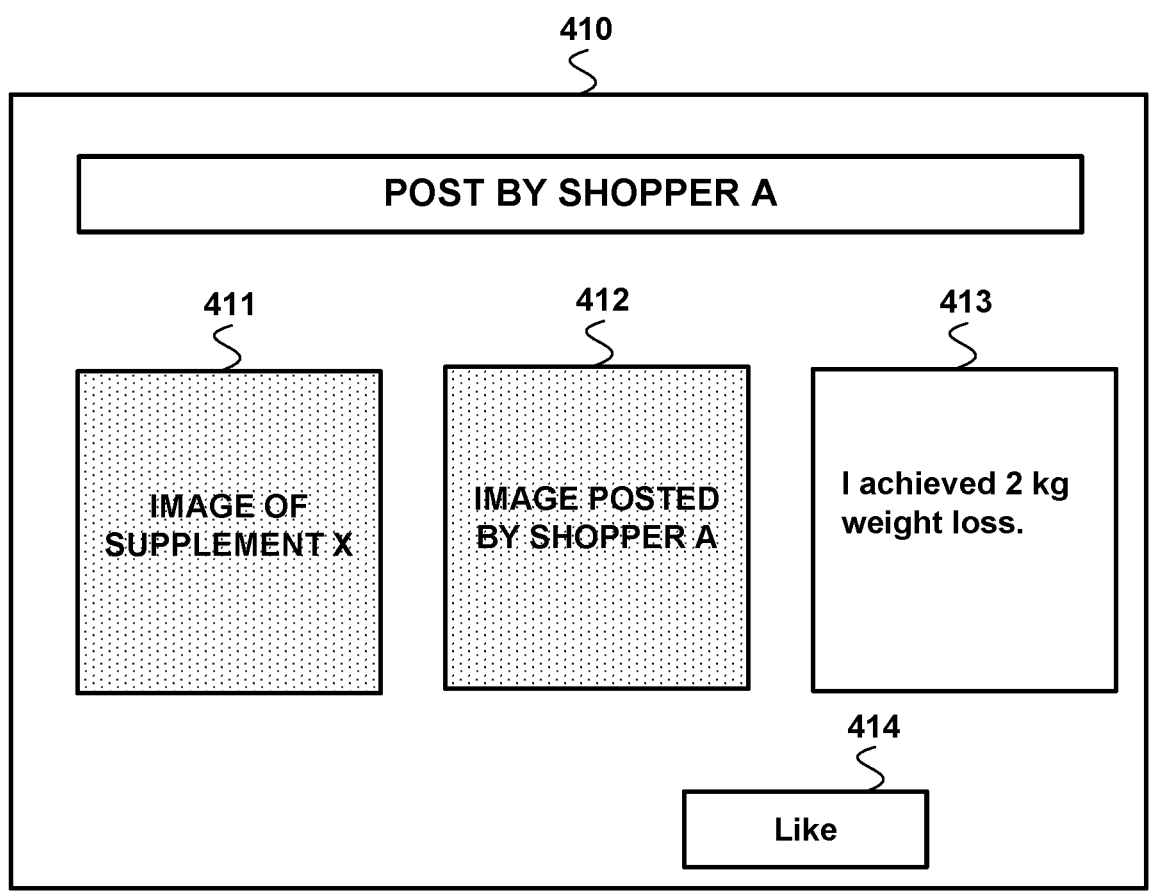
FIG. 4 is a diagram for describing a page according to the embodiment.

The publisher 102 publishes the post. For example, as illustrated in FIG. 4, the publisher 102 publishes the post accepted from the shopper A on a shopping site. A page 410 in FIG. 4 includes an image 411 of the supplement X purchased by the shopper A, an image 412 posted by the shopper A, a text 413 posted by the shopper A, and a button 414 for notifying that a posted content has been checked by a person having read the page 410.

Further, the publisher 102 preliminarily publishes, on a shopping site, the product and the activity associated with the product. Thus, before purchase of the product, the shopper can know the activity associated with the product. For example, when the activity is selected by the shopper, the publisher 102 suggests a product associated with the selected activity to the shopper.

For example, assume that a shopping site runs a promotion that offers a privilege when a preliminarily determined goal is achieved by use of a product. In this case, the product associated with the activity is, for example, a product helpful for achievement of a preliminarily determined goal.

Figure 5:
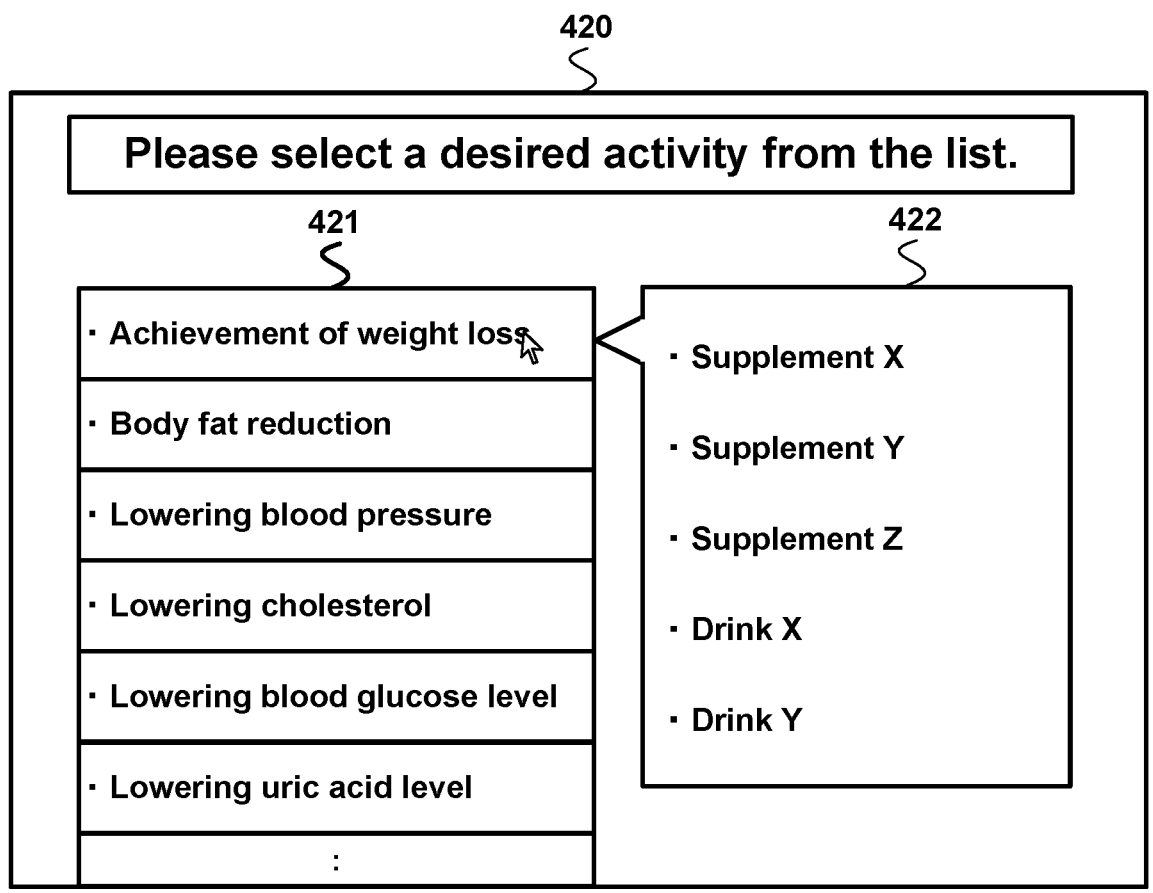
FIG. 5 is a diagram for describing a page according to the embodiment.

FIG. 5 illustrates an example of a page 420 preliminarily published on a shopping site. The page 420 includes a list 421 of activities (achievement of a goal) associated with a product. When any of the activities in the list 421 is selected by mouse over or the like, a list 422 of products associated with the selected activity is displayed. For example, when the shopper A selects achievement of weight loss, a list of products helpful for achievement of weight loss, including supplements and drinks dealt on the shopping site, is presented.

The report acceptor 103 accepts a report that another shopper having purchased the product has read the published post and checked a content of the read post.

The report that a content of the read post has been checked is done by, for example, selection of the button 414 on the page 410 in FIG. 4. For example, when a shopper B having purchased the supplement X reads, using a terminal device 200-B, the page 410 in FIG. 4 and selects the button 414, the report acceptor 103 accepts, from the shopper B, a report that the shopper B has read and checked the posted content by the shopper A.

Herein, the report acceptor 103 determines whether to accept the report according to whether a timing of the purchase of the product and the post by the shopper and a timing of the purchase of the product and the check by the other shopper satisfy a predetermined condition. For example, when a timing of the purchase by the shopper A is too far from a timing of the purchase by the shopper B, or when a period from the post by the shopper A to the check of the post by the shopper B is too long, an action of the shopper B is unlikely to be a motivator for the shopper A to continuously purchase the product. Thus, the report acceptor 103 accepts the report when the above timings satisfy a predetermined condition.

For example, in order that an action of a plurality of shoppers having purchased an identical product may be a motivator to continuously purchase the product, setting a condition that a plurality of shoppers purchases and uses an identical product in the same period of time and posts and checks on the use in the same period of time is effective. Thus, the report acceptor 103 sets following conditions (A) to (D) as a predetermined condition, and determines whether to accept the report according to whether any of the conditions is satisfied or whether a combination of any conditions is satisfied.

Figure 6:
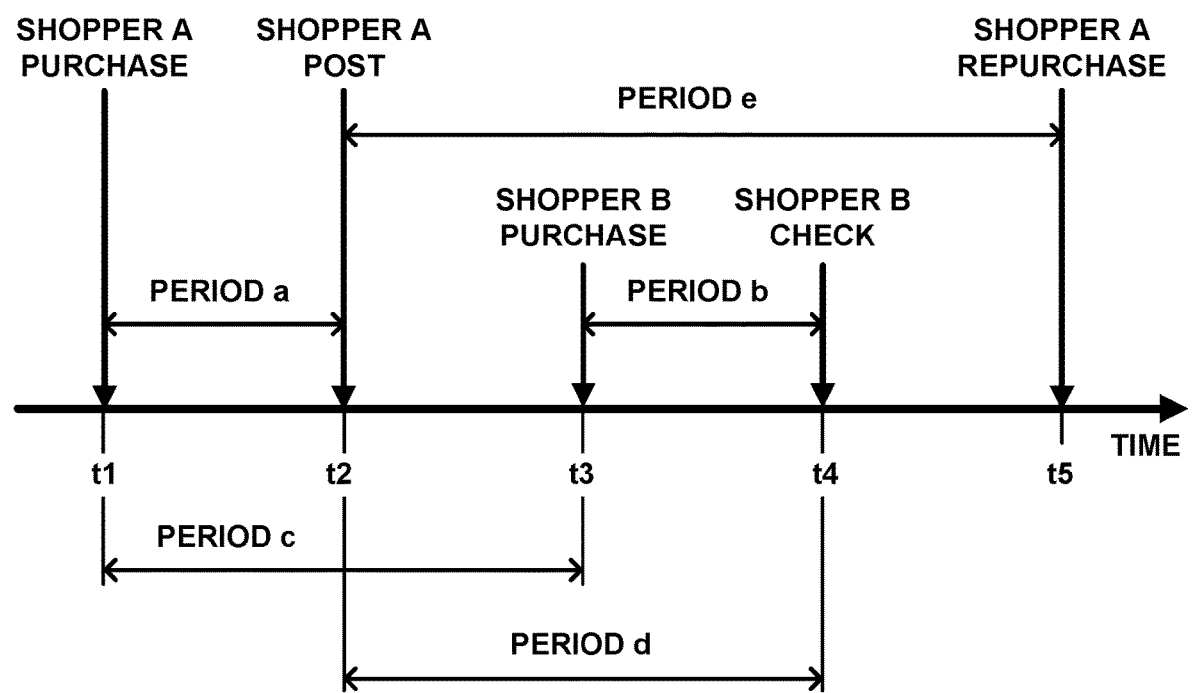
FIG. 6 is a diagram for describing a timing of purchase of a product and post by a shopper and a timing of purchase of the product and check by another shopper according to the embodiment.

FIG. 6 illustrates an example of a timing of the purchase of the supplement X and the post by the shopper A and a timing of the purchase of the supplement X and the check by the shopper B. Note that, FIG. 6 is one example, and a purchase time t3 of the shopper B may be prior to a post time t2 of the shopper A.

The predetermined condition is a condition (A) that a period from the purchase to the post by the shopper is within a first range. For example, the condition (A) is a condition that a period a from a purchase time t1 of the supplement X by the shopper A to the post time t2 of the post by the shopper A, indicating that the goal has been achieved by use of the supplement X, is "equal to or more than a week and within a month". The report acceptor 103 accepts the report from the other shopper when the period from the purchase time t1 to the post time t2 is "equal to or more than a week and within a month".

When the period a from the purchase time t1 to the post time t2 is too short, there is a possibility that the shopper A has written the post without using the purchased product. Further, when the period a from the purchase time t1 to the post time t2 is too long, there is a possibility that the posted content does not reflect influence by use of the purchased product. For example, assuming that the shopper A posts 2 kg weight loss half a year after purchasing the supplement X for thirty days, there is a high possibility that an effect for the weight loss could be obtained not by ingestion of the supplement X, but by another factor. Thus, setting the condition (A) guarantees reliability on that the shopper has used the purchased product and the post reflects the use.

Further, the predetermined condition is a condition (B) that a period from the purchase of the product to the check of the post by the other shopper is within a second range. For example, the condition (B) is a condition that a period b from the purchase time t3 of the supplement X by the shopper B to a check time t4 of the post of the shopper A by the shopper B is "equal to or more than a week and within a month". The report acceptor 103 accepts the report from the shopper B when the period from the purchase time t3 to the check time t4 is "equal to or more than a week and within a month".

When the period b from the purchase time t3 to the check time t4 is too short, there is a possibility that the shopper B has checked the post without using the product. Further, when the period b from the purchase time t3 to the check time t4 is too long, there is a possibility that the shopper B has checked the post after a lapse of long time after finishing use of the product. For example, assuming that the shopper B selects the button 414 half a year after purchasing the supplement X for thirty days, the shopper B has already used up the supplement X, and the selection of the button 414 is not a reaction by a shopper having used an identical product in the same period of time, resulting in having a reduced effect as a motivator for the shopper A. Thus, setting the condition (B) guarantees reliability on that the other shopper has used the purchased product and checked the post during the use.

Further, the predetermined condition is a condition (C) that a period from the purchase of the product by the shopper to the purchase of the product by the other shopper is within a third range. For example, the condition (C) is a condition that a period c from the purchase time t1 of the supplement X by the shopper A to the purchase time t3 by the shopper B is "equal to or more than zero days and within a month". The report acceptor 103 accepts the report from the shopper B when the period from the purchase time t1 to the purchase time t3 is "equal to or more than zero days and within a month".

When the period c from the purchase time t1 to the purchase time t3 is too long, it is unreasonable to regard the purchases as being made in the same period of time. Further, for example, when the product to be continuously purchased is a product that may differ in quality according to a timing of purchase such as fresh food, it is unreasonable to regard the purchases of the product as purchases of the same product. When the shoppers are not shoppers having purchased the same product in the same period of time, there is a possibility that an effect of the post and the check as a motivator for continuous purchase is reduced. Thus, setting the condition (C) allows for accepting the report from the shopper having purchased the product in the same period of time.

Further, the predetermined condition is a condition (D) that a period from the post by the shopper to the check of the post by the other shopper is within a fourth range. For example, the condition (D) is a condition that a period d from the post time t2 by the shopper A to the check time t4 by the shopper B is "equal to or more than zero days and within a month". The report acceptor 103 accepts the report from the shopper B when the period from the post time t2 to the check time t4 is "equal to or more than zero days and within a month".

The shorter period d from the post time t2 to the check time t4 may become a high motivator for the shopper having written the post. Further, the too long period d from the post time t2 to the check time t4 is unlikely to become a motivator for continuous purchase for the shopper A having written the post. For example, even when the shopper B selects the button 414 two months after the shopper A writes the post, the shopper A has already lost interest in the supplement X, and there is a possibility that a reaction by the shopper B is unlikely to become a motivator. Thus, setting the condition (D) allows for accepting the report being a motivator for continuous purchase.

Further, the report acceptor 103 relaxes the predetermined condition according to the number of other shoppers determined as having made the report to be accepted.

Specifically, when the number of other shoppers determined as having made the report to be accepted is less than a predetermined value, the report acceptor 103 relaxes the predetermined condition in such a way that the number of other shoppers determined as having made the report to be accepted increases.

The number of other shoppers determined as having made the report to be accepted is stored in the recording medium 14 in association with an ID for identifying the shopper and an ID for identifying the post of the shopper. The report acceptor 103 refers to information stored in the recording medium 14 and specifies the number of other shoppers determined as having made the report to be accepted.

For example, when the report acceptor 103 adopts, as a condition for accepting the report, a condition that all of the conditions (A) to (D) are satisfied, and when other shoppers determined as having made the report to be accepted regarding the post of the shopper A on the page 410 are less than "two", the report acceptor 103 changes the condition for accepting the report to only the condition (A). When the condition is relaxed in this way, the condition about a timing of the purchase of the product and the post by the other shopper is eliminated, resulting in determination that the report acceptor 103 has accepted more reports.

The determiner 104 determines, when the shopper repurchases the product, a privilege to be granted to the shopper according to whether the report is accepted by the report acceptor 103.

The privilege is, for example, points that can be used on a shopping site, a right to get a discount, and the like.

For example, when the shopper A purchases the supplement X (purchase time t1) and thereafter repurchases the supplement X (purchase time t5), and when determination is made that the report is accepted from the other shopper by selecting the button 414 on the page 410 on which the post indicating achievement of the goal by use of the supplement X is published, the determiner 104 grants predetermined points to the shopper A. Specifically, the determiner 104 refers to the recording medium 14 and specifies the number of other shoppers determined as having made the report to be accepted on the page 410, and, when the specified number is 1 or more, the determiner 104 grants predetermined points to the shopper A according to the number of other shoppers determined as having made the report to be accepted.

Herein, the determiner 104 determines the privilege to be granted to the shopper when a period from the post by the shopper to the repurchase of the product by the shopper is within a fifth range. Hereinafter, a condition that the period from the post by the shopper to the repurchase of the product by the shopper is within the fifth range is a condition (E).

For example, when a period e from the post time t2 by the shopper A to the purchase time t5 of the repurchase of the supplement X by the shopper A is "equal to or more than zero days and within three months", the determiner 104 grants points to the shopper A. When the period e from the post time t2 to the purchase time t5 is long, the determiner 104 does not grant points because it is unreasonable to determine in such case that the product is continuously purchased after use of the product. Thus, setting the condition (E) allows for determining continuous purchase of the product and granting the privilege to the shopper.

Information on the determined privilege is stored in the recording medium 14 in association with an ID for identifying the shopper. Further, a content of the determined privilege is notified to the shopper by an email, or on a page in a shopping site after login to the shopping site. Note that, regarding a notification method to the shopper, any method can be adopted, and, besides the above, for example, a push notification, a banner notification, a voice notification, a notification on an app screen, a notification on a privilege acquisition history screen (a points history screen when the privilege is points), a notification by use of various types of media such as a social networking service (SNS) and a messaging app, or the like can be adopted.

4. Operation of Privilege Granting Device according to Embodiment

An operation of the privilege granting device 100 according to the present embodiment will be described using FIG. 7. For example, when powered on, the privilege granting device 100 starts privilege granting processing illustrated in FIG. 7.

The post acceptor 101 determines whether a post that a shopper having purchased a product has done an activity associated with the product is accepted from the shopper (Step S101). When the post acceptor 101 determines that the post is accepted (Step S101; YES), the publisher 102 publishes the post (Step S102). Meanwhile, when the post acceptor 101 determines that the post is not accepted (Step S101; NO), the processing proceeds to Step S108.

For example, when the shopper A having purchased the supplement X posts an image of measuring weight on a scale and a text indicating achievement of 2 kg weight loss, the post acceptor 101 determines that a post is accepted, and the publisher 102 publishes the page 410 in FIG. 4 on a shopping site. Meanwhile, when the post acceptor 101 does not accept, from a shopper having purchased a product on a shopping site, a post indicating that the shopper has done an activity included in the list 421 on the page 420 in FIG. 5, the post acceptor 101 waits as is.

Next, the report acceptor 103 determines whether a report that another shopper having purchased the product has read the published post and checked a content of the read post is received (Step S103). When the report acceptor 103 determines that the report is received (Step S103; YES), the report acceptor 103 determines whether a timing of the purchase of the product and the post by the shopper and a timing of the purchase of the product and the check by the other shopper satisfy a predetermined condition (Step S104). Meanwhile, when the report acceptor 103 determines that the report is not received (Step S103; NO), the processing returns to Step S101.

For example, when the shopper B having purchased the supplement X reads the page 410 in FIG. 4 and selects the button 414, the report acceptor 103 determines that a signal indicating the selection of the button 414 is received from the terminal device 200-B of the shopper B. Then, when the predetermined condition is a condition that all of the conditions (A) to (D) are satisfied, the report acceptor 103 determines whether a timing of the purchase of the supplement X and the post of the page 410 by the shopper A and a timing of the purchase of the supplement X and the selection of the button 414 by the shopper B satisfy the conditions (A) to (D). Meanwhile, when the report acceptor 103 does not receive a signal indicating the selection of the button 414 on the page 410, the processing returns to Step S101.

In Step S104, when the report acceptor 103 determines that a timing of the purchase of the product and the post by the shopper and a timing of the purchase of the product and the check by the other shopper satisfy a predetermined condition (Step S104; YES), the report acceptor 103 determines to accept the report that the content of the post has been checked from the other shopper (Step S105). Then, the processing returns to Step S101. Meanwhile, when the report acceptor 103 determines that a timing of the purchase of the product and the post by the shopper and a timing of the purchase of the product and the check by the other shopper do not satisfy a predetermined condition (Step S104; NO), the report acceptor 103 determines whether the number of other shoppers determined as having made the report to be accepted at a point of time of the processing in Step S104 is less than a predetermined value (Step S106).

For example, when the purchase time t1 and the post time t2 of the shopper A and the purchase time t3 and the check time t4 of the shopper B satisfy of the conditions (A) to (D), the report acceptor 103 determines to accept the report indicating that the page 410 has been read and checked from the shopper B. Then, the processing returns to Step S101. Meanwhile, when the purchase time t1 and the post time t2 of the shopper A and the purchase time t3 and the check time t4 of the shopper B do not satisfy any of the conditions (A) to (D), the report acceptor 103 determines whether the number of other shoppers determined so far as having made the report to be accepted regarding the post of the shopper A by the time is less than "two".

In Step S106, when the report acceptor 103 determines that the number of other shoppers determined as having made the report to be accepted at a point of time of the processing in Step S104 is less than a predetermined value (Step S106; YES), the report acceptor 103 relaxes the predetermined condition (Step S107). Meanwhile, when the report acceptor 103 determines that the number of other shoppers determined as having made the report to be accepted at a point of time of the processing in Step S104 is equal to or more than a predetermined value (Step S106; NO), the processing proceeds to Step S101.

For example, when the report acceptor 103 determines that the number of other shoppers determined as having made the report to be accepted regarding the post of the shopper A at a point of time when determining whether the timings satisfy all of the conditions (A) to (D) is less than "two", the report acceptor 103 sets the predetermined condition to a condition that only the condition (A) is satisfied. Meanwhile, when the report acceptor 103 determines that the number of other shoppers determined as having made the report to be accepted regarding the post of the shopper A at a point of time when determining whether all of the conditions (A) to (D) are satisfied is equal to or more than "two", the processing proceeds to Step S101.

In Step S101, when the post acceptor 101 determines that a post that a shopper having purchased a product has done an activity associated with the product is not accepted from the shopper (Step S101; NO), the determiner 104 next determines whether the shopper repurchases the product on which the shopper has made the post that the shopper has done the activity (Step S108). When the determiner 104 determines that the shopper repurchases the product on which the shopper has posted an activity (Step S108; YES), the determiner 104 determines a privilege to be granted to the shopper according to whether the privilege granting device 100 accepts the report (Step S109). Meanwhile, when the determiner 104 determines that the shopper does not repurchase the product on which the shopper has posted an activity (Step S108; NO), the processing proceeds to Step S103.

For example, assuming that the shopper A repurchases the supplement X after purchasing the supplement X, the determiner 104 refers to the recording medium 14, and, when the number of other shoppers determined as having made the report to be accepted from other shoppers on the page 410 is equal to or more than one, the determiner 104 grants predetermined points to the shopper A according to the number of other shoppers determined as having made the report to be accepted. Meanwhile, when the shopper A does not repurchase the supplement X after purchasing the supplement X, the determiner 104 proceeds the processing to Step S103.

The present embodiment can provide motivation to continuously purchase a product by posting and checking, between shoppers having purchased the same product, that an activity associated with the product has been done, and thereby granting a privilege. For example, in a case of a product sold as having an effect in achievement of a goal, a privilege is granted if a shopper publicizes an achievement status of the goal and gets a reaction from another shopper, and thus, the shopper can be encouraged to write a post indicating that the goal has been achieved by use of the product. Then, an effect by encouragement between shoppers can be expected by publicizing an achievement status of the goal and giving back a reaction between shoppers having purchased the same product. Thus, the shopper can be encouraged to continuously purchase the product for further achievement of the goal.

Further, the present embodiment can cause a sense of unity between shoppers and further encourage continuous purchase by granting a privilege to a shopper when posting and checking between shoppers having purchased the same product in the same period of time are performed.

5. Modification Example

While the embodiment of the present disclosure has been described in the above, modifications and applications in various forms are possible for carrying out the present disclosure.

In the above embodiment, the activity associated with the product is achievement of a preliminarily determined goal by use of the product, but is not limited thereto. The activity associated with the product may be use of the product. For example, when the product is the supplement X, the activity associated with the product is ingestion and consumption of the supplement X. The shopper can be encouraged to continuously use and continuously purchase the product by publicizing a use status of the product and giving back a reaction that the use status has been checked between shoppers having purchased the same product.

Further, the first range, the second range, the third range, the fourth range, and the fifth range according to the above embodiment can be set to any range. These ranges can be changed according to the product and a content of the activity associated with the product. For example, when the content of the activity is achievement of a certain goal by use of the product, the shopper sets the above ranges in consideration of an expected period to be required for the achievement of the goal. For example, when the activity content is earning a score of 900 points or more in an English certificate exam and the product is a book, the first range is set to "equal to or more than a month and within three months".

Further, in the above embodiment, relaxation of a predetermined condition is reducing the number of conditions to be adopted among the conditions (A) to (D), but is not limited thereto. For example, the relaxation of a predetermined condition may be extending a period by changing a start point and an end point of the first range, the second range, the third range, or the fourth range. Further, a content of the relaxation of a predetermined condition may be changed according to the product and the content of the activity associated with the product.

Further, in the above embodiment, the determiner 104 grants predetermined points to the shopper A according to the number of other shoppers determined as having made the report to be accepted, but is not limited thereto. For example, the determiner 104 may determine the privilege to be granted to the shopper according to whether a timing of the purchase of the product and the post by the shopper and a timing of the purchase of the product and the check by the other shopper satisfy a predetermined condition, and whether a period from the post by the shopper to the repurchase of the product by the shopper is within a fifth range. For example, the determiner 104 determines more points to be granted to the shopper A when more conditions among the above conditions (A) to (E) are satisfied.

Further, in the above embodiment, the determiner 104 determines the privilege to be granted to the shopper when the number of other shoppers determined as having made the report to be accepted is equal to or more than one, but is not limited thereto. For example, even when the number of other shoppers determined as having made the report to be accepted is zero, the determiner 104 may determine the privilege to be granted to the shopper having made the post that the shopper has done the activity. In this case, however, the determiner 104 determines a smaller amount of privilege than when other shoppers determined as having made the report to be accepted are equal to or more than one. This enables encouraging the shopper to make a post that the shipper has done the activity.

Figure 7:
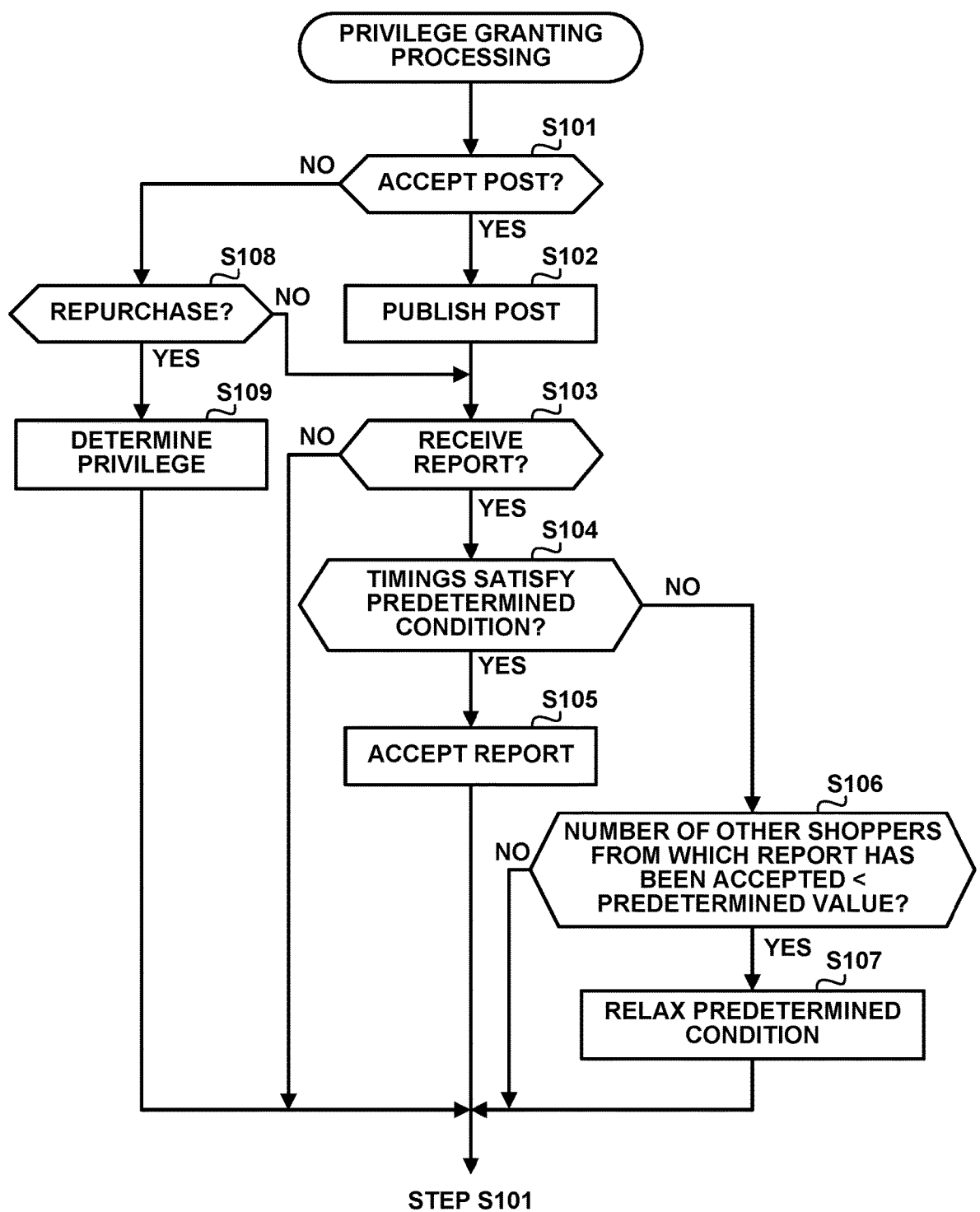
FIG. 7 is a flowchart for describing privilege granting processing according to the embodiment.

Further, in the above embodiment, the operation of the privilege granting device 100 has been described using the flowchart illustrated in FIG. 7, but the operation of the privilege granting device 100 is not limited thereto. For example, Steps S104, S106, and S107 are optional. In other words, a condition may not be set for a timing of the purchase of the product and the post by the shopper and a timing of the purchase of the product and the check by the other shopper. Alternatively, Steps S106 and S107 may be omitted. In other words, a predetermined condition may not be relaxed on the basis of the number of other shoppers determined as having made the report to be accepted. In this case, in Step S104, when the report acceptor 103 determines that a timing of the purchase of the product and the post by the shopper and a timing of the purchase of the product and the check by the other shopper do not satisfy a predetermined condition (Step S104; NO), the processing returns to Step S101.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide a privilege granting device, a privilege granting method, and a program capable of providing motivation to continuously purchase a product by posting and checking, between shoppers having purchased the same product, that an activity associated with the product has been done.

REFERENCE SIGNS LIST

11 CPU
12 ROM
13 RAM
14 Recording medium
15 Output device
16 Communication device
17 Operation device
18 Bus
100 Privilege granting device
101 Post acceptor
102 Publisher
103 Report acceptor
104 Determiner
200 Terminal device
300 Network
410, 420 Page
411, 412 Image
413 Text
414 Button
421, 422 List

The invention claimed is:

1. A privilege granting device comprising:
at least one memory that stores computer program code; and
at least one processor configured to read the computer program code and operate according to the computer program code, the computer program code including:
first publication code configured to cause the at least one processor to publish on a website, a product and an activity in association with each other;
post acceptance code configured to cause the at least one processor to accept, from a user having acquired the product, a post that the user has performed the activity associated with the product, wherein the post acceptance code is further configured to cause the at least one processor to make a determination that the post includes an image of which a content matches with the activity associated with the product and accept the post based on the determination;
second publication code configured to cause the at least one processor to generate a post to be published, the generated post including a display item that is selectable by another user to notify that a content of the published post has been checked by the another user, and publish the generated post;
report acceptance code configured to cause the at least one processor to accept a report that the another user after having previously acquired the product has read the published post and checked the content of the read post, based on a result of selecting, by the another user, the display item on the read post; and
determination code configured to cause the at least one processor to determine, based on the user reacquiring the product, a privilege to be granted to the user according to whether the report is accepted.

2. The privilege granting device according to claim 1, wherein the first publication code is configured to cause, based on the activity being selected by the user, the at least one processor to suggest the product associated with the selected activity to the user.

3. The privilege granting device according to claim 1, wherein the report acceptance code is configured to cause the at least one processor to determine whether to accept the report according to whether a timing of the acquisition of the product and the post by the user and a timing of the acquisition of the product and the check by the another user satisfy a predetermined condition.

4. The privilege granting device according to claim 3, wherein the report acceptance code is configured to cause the at least one processor to relax the predetermined condition according to a number of other users determined as having made the report to be accepted.

5. The privilege granting device according to claim 4, wherein the report acceptance code is configured to cause, based on the number of other users determined as having made the report to be accepted being less than a predetermined value, the at least one processor to relax the predetermined condition in such a way that the number of other users determined as having made the report to be accepted increases.

6. The privilege granting device according to claim 3, wherein the predetermined condition is a condition that a period from the acquisition to the post by the user is within a first range.

7. The privilege granting device according to claim 3, wherein the predetermined condition is a condition that a period from the acquisition of the product to the check of the post by the another user is within a second range.

8. The privilege granting device according to claim 3, wherein the predetermined condition is a condition that a period from the acquisition of the product by the user to the acquisition of the product by the another user is within a third range.

9. The privilege granting device according to claim 3, wherein the predetermined condition is a condition that a period from the post by the user to the check of the post by the another user is within a fourth range.

10. The privilege granting device according to claim 1, wherein the determination code is configured to cause the at least one processor to determine the privilege to be granted to the user based on a period from the post by the user to the reacquisition of the product by the user being within a fifth range.

11. The privilege granting device according to claim 3, wherein the determination code is configured to cause the at least one processor to determine the privilege to be granted to the user according to
whether the timing of the acquisition of the product and the post by the user and the timing of the acquisition of the product and the check by the another user satisfy the predetermined condition, and
whether a period from the post by the user to the reacquisition of the product by the user is within a fifth range.

12. The privilege granting device according to claim 1, wherein the activity associated with the product is use of the product.

13. The privilege granting device according to claim 1, wherein the activity associated with the product is achievement of a preliminarily determined goal by use of the product.

14. A privilege granting method executed by a privilege granting device, the privilege granting method comprising:
publishing, by the privilege granting device, on a website, a product and an activity in association with each other;
accepting, by the privilege granting device, from a user having acquired the product, a post that the user has performed the activity associated with the product, wherein the accepting comprises making a determination that the post includes an image of which a content matches with the activity associated with the product and accepting the post based on the determination;

generating, by the privilege granting device, a post to be published, the generated post including a display item that is selectable by another user to notify that a content of the published post has been checked by the another user, and publishing the generated post;

accepting, by the privilege granting device, a report that the another user, after having previously acquired the product, has read the published post and checked the content of the read post, based on a result of selecting, by the another user, the display item on the read post; and determining, by the privilege granting device, based on the user reacquiring the product, a privilege to be granted to the user according to whether the report is accepted.

15. A non-transitory computer readable information recording medium having stored therein a program that causes a computer to:

publish, on a website, a product and an activity in association with each other;

accept, from a user having acquired the product, a post that the user has performed the activity associated with the product, wherein the accepting comprises making a determination that the post includes an image of which a content matches with the activity associated with the product and accepting the post based on the determination;

generate a post to be published, the generated post including a display item that is selectable by another user to notify that a content of the published post has been checked by the another user, and publish the generated post;

accept a report that the another user, after having previously acquired the product, has read the published post and checked the content of the read post, based on a result of selecting, by the another user, the display item on the read post; and determine, based on the user reacquiring the product, a privilege to be granted to the user according to whether the report is accepted.

* * * * *